J. FRITSCH.
RAT OR ANIMAL TRAP.
APPLICATION FILED FEB. 6, 1913.
1,093,691.
Patented Apr. 21, 1914.
2 SHEETS—SHEET 1.
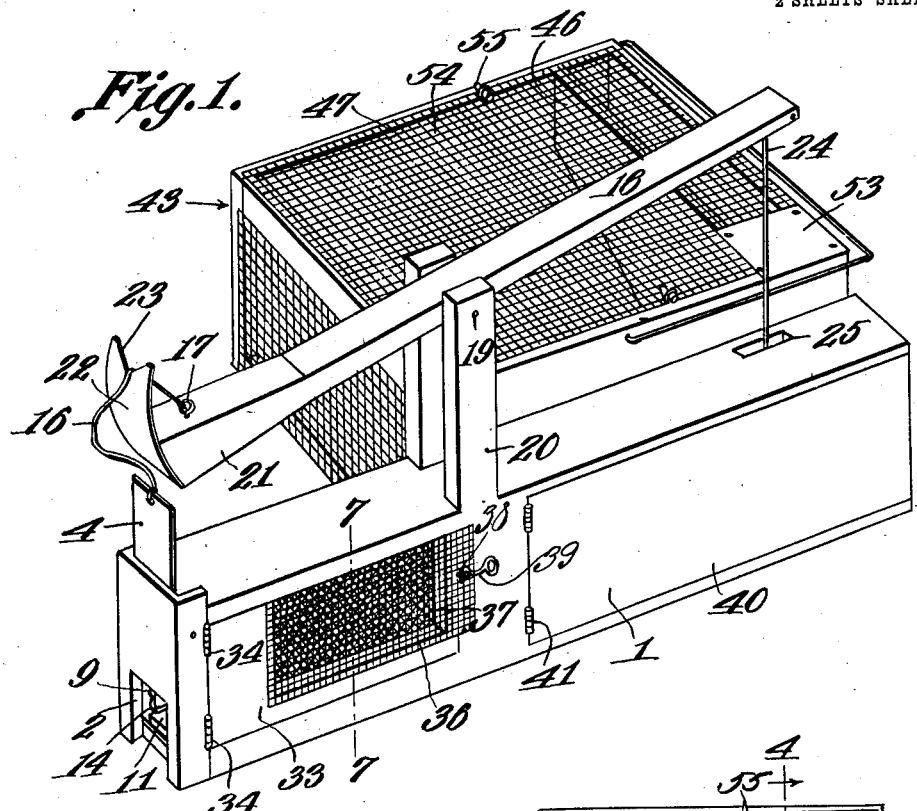
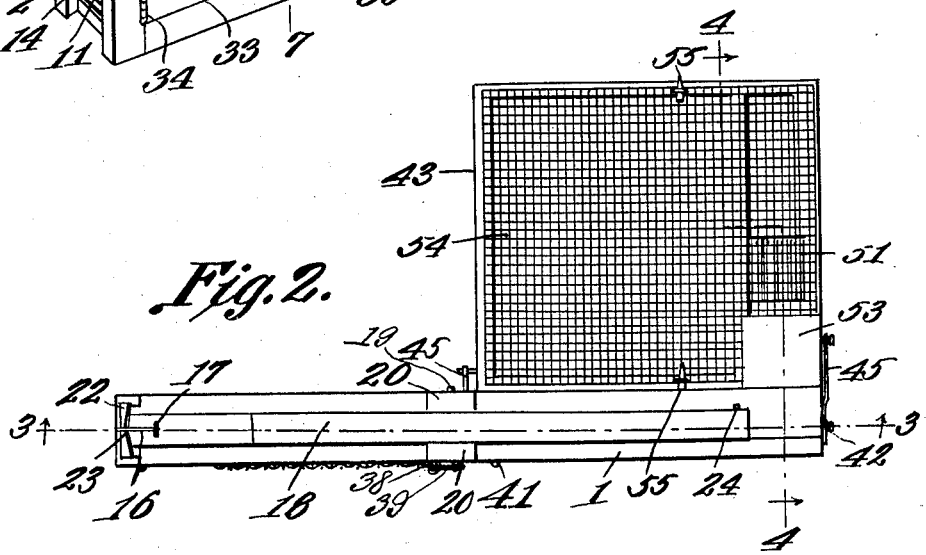
Joseph Fritsch,
Inventor J. FRITSCH.
RAT OR ANIMAL TRAP.
APPLICATION FILED FEB. 6, 1913.
1,093,691.
Patented Apr. 21, 1914.
2 SHEETS—SHEET 2.
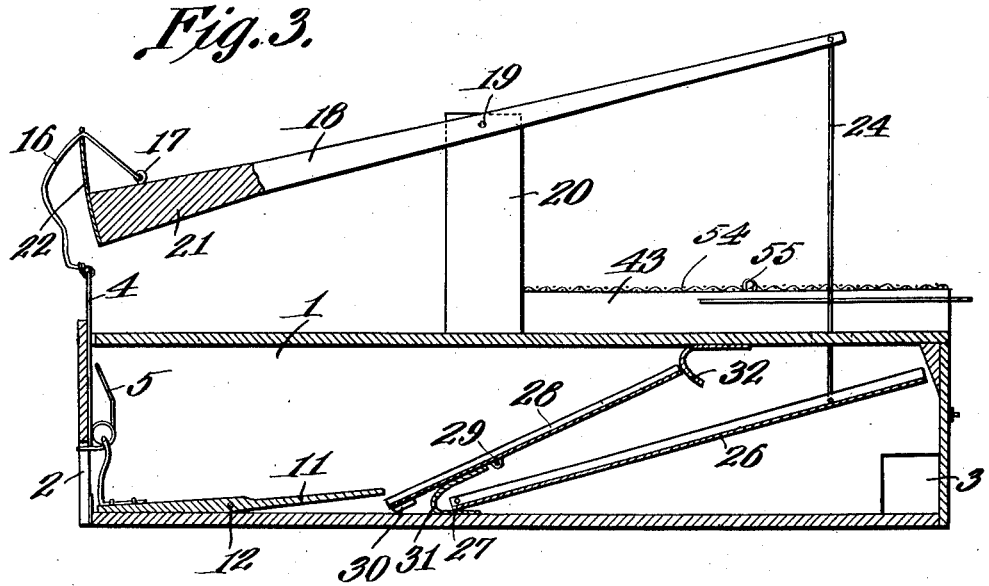
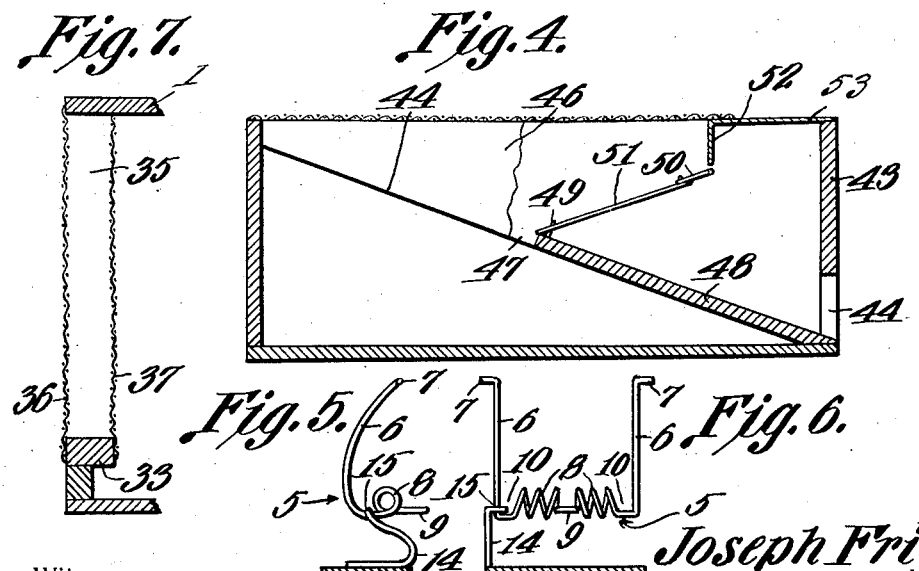
Witnesses
Joseph Fritsch,
Inventor
by C. A. Snow & Co.
Attorneys

UNITED STATES PATENT OFFICE.

JOSEPH FRITSCH, OF SEDRO WOOLLEY, WASHINGTON.

RAT OR ANIMAL TRAP.

1,093,691.   Specification of Letters Patent.   Patented Apr. 21, 1914.

Application filed February 6, 1913. Serial No. 746,601.

*To all whom it may concern:*

Be it known that I, JOSEPH FRITSCH, a citizen of the United States, residing at Sedro Woolley, in the county of Skagit and State of Washington, have invented a new and useful Rat or Animal Trap, of which the following is a specification.

The device forming the subject matter of this invention is a trap of that general type in which an animal, having entered the trap, opens the door of the trap to permit the entrance of another animal, egress of the trapped animal being prevented; and this invention aims primarily to improve the setting and releasing mechanism of a device of the type herein disclosed.

It is within the scope of the invention to improve generally, and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of invention herein-disclosed can be made within the scope of what is claimed without departing from the spirit of the invention.

In the drawings:—Figure 1 shows the invention in perspective; Fig. 2 is a top plan; Fig. 3 is a longitudinal section of the cage on the line 3—3 of Fig. 2; Fig. 4 is a transverse section on the line 4—4 of Fig. 2; Fig. 5 is a side elevation of the door controlling mechanism and attendant parts; Fig. 6 is an elevation of the structure shown in Fig. 5, the view point in Fig. 6 being remote from the view point in Fig. 5; and Fig. 7 is a fragmental section on the line 7—7 of Fig. 1.

In carrying out the invention there is provided a case 1 which is an oblong, box-like structure, provided at one end with an entrance opening 2 and equipped in its side wall adjacent its outer end with an exit 3. The entrance opening 2 is controlled by a vertically moving door 4. The door 4 is held elevated by means of a latch 5.

The latch 5, as will be understood when Figs. 5 and 6 are examined, is bail shaped and comprises arms 6 terminating in rectangularly disposed spindles 7 pivoted in the side walls of the case 1. The arms 6 are extended to form a helix 8, the intermediate portion of the helix 8 being forwardly extended to form a loop shaped detent 9 adapted to engage the door 4 in order to uphold the door. For a purpose to be hereinafter described, the outer ends of the helix 8 are spaced apart, as at 10 from the arms 6. The helix 8 serves to counterweight the latch and to cause the detent 9 to swing automatically beneath the lower edge of the door 4, as soon as the door is raised by mechanism which will be described hereinafter.

Extended longitudinally of the case 1 is a releasing lever 11 which is fulcrumed intermediate its ends on the side walls of the case 1 as indicated at 12. Secured to the forward end of the releasing lever 11 is a latch-engaging member 14 which, roughly speaking, is in the form of the numeral 2. At the free, upper end of the latch engaging member 14 is formed a laterally extended finger 15 adapted to bear against one of the arms 6.

Presupposing that the door 4 is in the elevated position shown in the drawings, and is upheld by the detent 9, the animal, having entered the trap and having trodden upon the releasing lever 11, will cause the finger 15 of the latch-engaging member 14 to ride along one arm 6 of the latch 5, thereby withdrawing the detent 9 from beneath the door 4, whereupon the door 4 will move down under its own weight. Because the arms 6 are spaced apart as at 10 from the ends of the helix 8, the finger 15 is permitted to swing past the end of the helix and to ride upon one arm 6 of the latch 5, thereby permitting the door 4 to drop in the manner hereinbefore set forth.

In order to raise the door 4, a flexible element 16 is secured to the door, one end of the flexible element 16 being attached as indicated at 17, to a setting lever 18, fulcrumed intermediate its ends as at 19, upon standards 20 which are secured to the side walls of the case 1. At its forward end, the setting lever 18 is counterweighted as indicated at 21, so that the forward end of the setting lever normally stands in a lowered position. A plate 22 is secured to the forward end of the counterweighted portion 21 of the setting lever 18, the plate having a notch 23 in its upper edge, through which the flexible element 16 passes. The plate 22 is curved, as clearly shown in Figs. 1 and 2, so that when the lever 18 is tilted, to raise the door 4, the door 4 will not be pulled transversely, and longitudinally of the case 1, by the flexible element 16. A binding of the door 4, as it is raised is thereby avoided. Pivotally secured to the rear end of the lever 18 is a downwardly extending link 24 which passes through an opening 25 at the top of the case 1. The lower end of the link 24 is pivotally secured to a primary run way 26 extended longitudinally of the case 1, the forward end of the primary runway 26 being pivoted adjacent the bottom of the case 21 as indicated at 27. Located in front of and above the primary run way 26 is an auxiliary run way 28 which is fulcrumed intermediate its ends as indicated at 29, on the side walls of the case 1. The forward end of the auxiliary run way 28 is counterweighted as indicated at 30, so that the auxiliary run way stands in a downwardly and forwardly inclined position, as clearly shown in Fig. 3. A closure plate 31 is secured to the bottom of the case 1 in advance of the forward end of the primary run way 26. The curved closure plate 31 is rearwardly extended and its upper, free end lies beneath and constitutes a stop for the forward lower end of the auxiliary run way. Secured to the top of the case 1 is a curved closure plate 32 which is downwardly and rearwardly extended. The closure plate 32 extends across the rear end of the auxiliary run way 28.

After the animal has entered the trap and has actuated the releasing lever 11 in the manner hereinbefore set forth, to permit the door 4 to drop, the animal passes upon the auxiliary run way 28 which will tilt downwardly at its rear end, the animal passing from the auxiliary run way 28 onto the main run way 26, the rear end of which will be depressed by the weight of the animal. So soon as the animal steps off the auxiliary runway 28, the same will assume the inclined position shown in Fig. 3, and owing to the presence of the closure plates 31 and 32, the animal which is upon the main runway 26 cannot pass rearwardly, either over the upper edge of the auxiliary runway 28, or beneath the lower ends thereof. The animal, therefore, is securely imprisoned upon the main runway 26. When the main runway 26 is depressed by the weight of the animal, the link 24 will tilt the setting lever 18, the lever, at its forward, counterweighted end 21, swinging upward, whereupon the flexible element 16 will elevate the door 4, the latch 5 swinging forwardly under the weight of helical portions 8, so that the detent 9 of the latch will automatically and gravitationally engage beneath the lower edge of the door 4. The door 4, therefore, by action of the animal imprisoned in the trap, will be held in the elevated position shown in Figs. 1 and 3. When the rear end of the primary runway 26 is depressed in the manner hereinbefore set forth, the animal will be free to pass out of the case 1, through the exit 3. From the exit 3, the animal passes into a receptacle which will now be described.

The receptacle 43 is a box-like structure and is equipped at one side with an opening 44 adapted to be alined with the exit 3 from the case 1. The receptacle 43 is held upon the case 1 by means of hooks 45, shown most clearly in Fig. 2, or by means of other structures adapted to a like end. A partition 46 extends transversely of the receptacle 43, and is located approximately at right angles to the longer dimensions of the case 1. The lower edge of the partition 46 is cut away as indicated at 47 to permit the animal to pass into the body portion of the receptacle after having traversed an inclined runway 48 which is located between the partition 46 and one end wall of the receptacle.

Fixed to and upstanding from the runway 48 are pins 49. These pins 49 coöperate with a pivotally mounted gate 50, the free end of which is provided with a plurality of pins 51, which register between the pins 49. Obviously, the gate 50 may be lifted at its free end by the animal traversing the runway 48, but after the animal has passed the end of the gate, retreat will be impossible. The upper, pivoted end of the gate 51 is located adjacent a depending lip 52, on a closure 53 which is placed at one corner of the top of the receptacle 43. Any desired portion of the receptacle 43 may be closed in by a screen, as will be readily understood by reference to Fig. 1. If desired, the top of the receptacle 43 may include a removable lid 54, held in place by locking devices 55 of any desired sort.

A movable closure is provided in the case 1, opposite to the releasing lever 11. This closure comprises a frame 33 which is hinged to the side wall of the case 1 as indicated at 34. In the frame 33 there is an opening 35. A screen 36 is secured to one side of the frame, and a screen 37 is secured to the opposite side of the frame. The screen 36 projects at one end beyond the free end of the frame 33, as clearly shown in Fig. 1, the projecting end 38 of the screen 36 overlapping one side wall of the case 1.

A locking device of any desired sort, indicated at 39, engages with the projecting end 38 of the screen 36, so as to hold the hinged closure in place. It is to be observed that the bottom portion of the frame 33, the end portions thereof, and the screens 36 and 37 define a compartment adapted to receive the bait. This compartment is open at the top and the bait may be introduced readily thereinto, when the closure is in a partially opened position. When, however, the closure is locked, the top of the case 1 serves as a closure for the bait receptacle, so that the bait cannot be removed therefrom, either from the inside of the trap or from the outside of the trap.

A door 40 is hinged to the side wall of the case, as indicated at 41, this door 40 serving to give access to the runways 26 and 28, and attendant mechanism. The door 40 may be held in closed position by means of a hook 42 or by means of a locking device of any other sort, adapted to a like end.

When the animal has traversed the case 1 and has entered the receptacle 43, the receptacle may be detached from the case by manipulating the hooks 45. Owing to the presence of the pivotally mounted pins 51, the animal cannot retreat from the receptacle 43 and the animal, being imprisoned in the receptacle 43 may be drowned or exterminated in any other convenient manner.

Having thus described the invention what is claimed is:—

1. In a device of the class described, a case; a door mounted to move on the case; a latch on the case and adapted to engage the door to hold the door in an open position; a releasing lever fulcrumed upon the case; means carried by the releasing lever for engaging the latch, to disengage the latch from the door; a primary runway pivotally supported within the case; a setting lever fulcrumed intermediate its ends upon the case; a connection between one end of the setting lever and the primary runway; a connection between the other end of the setting lever and the door; an auxiliary runway pivotally supported in the case and located between the primary runway and the releasing lever, the auxiliary runway being depressible to engage the primary runway.

2. In a device of the class described, a case; a door mounted to move upon the case; means for holding the door in an opened position; a releasing lever fulcrumed into the case and coöperating with the door holding means to disengage the door holding means from the door; a primary runway pivotally supported in the case; an operative connection between the primary runway and the door, for moving the door into an open position; an auxiliary runway pivotally supported intermediate its ends upon the case and adapted to engage the primary runway to actuate the same; and closure members carried by the top and bottom of the case, the closure members coöperating with the ends of the auxiliary runway to prevent an animal from passing above or below the auxiliary runway after the animal has passed upon the primary runway.

3. In a device of the class described, a case; locking mechanism carried by the case; a frame pivoted to the case and constituting a closure for the case; members secured to the frame, one member being foraminous, the members and the frame defining a bait receptacle, open at the top, the frame being adapted to swing beneath the top of the case, whereby the top of the case will constitute a closure for the upper edge of the bait receptacle.

4. In a device of the class described, a box-like case; locking mechanism carried by the case; a door movably connected with the case and having an opening in its upper edge, defining a bait receptacle, said edge of the door being adapted to move beneath one wall of the case, whereby said wall of the case will constitute a closure for the bait receptacle, when the door is in closed position; one wall of the door being overlapped upon the case and being engaged by the locking mechanism.

5. In a device of the class described, a case; a door mounted to slide upon the case; a latch including arms pivotally supported in the case, and a helix connecting the arms, the intermediate portion of the helix being extended to form a detent, adapted to engage with the door, to hold the door open, the helix constituting a counter-weight for moving the latch to position beneath the detent for engagement with the door; and a releasing member including a finger adapted to traverse one arm of the latch to withdraw the detent out of engagement with the door, one end of the helix being spaced from said arm to permit the finger to move with respect to said arm.

In testimony that I claim the foregoing as my own, I have hereto affixed my signature in the presence of two witnesses.

JOSEPH FRITSCH.

Witnesses:
C. E. THOMPSON,
WM. T. WEST,